UNITED STATES PATENT OFFICE.

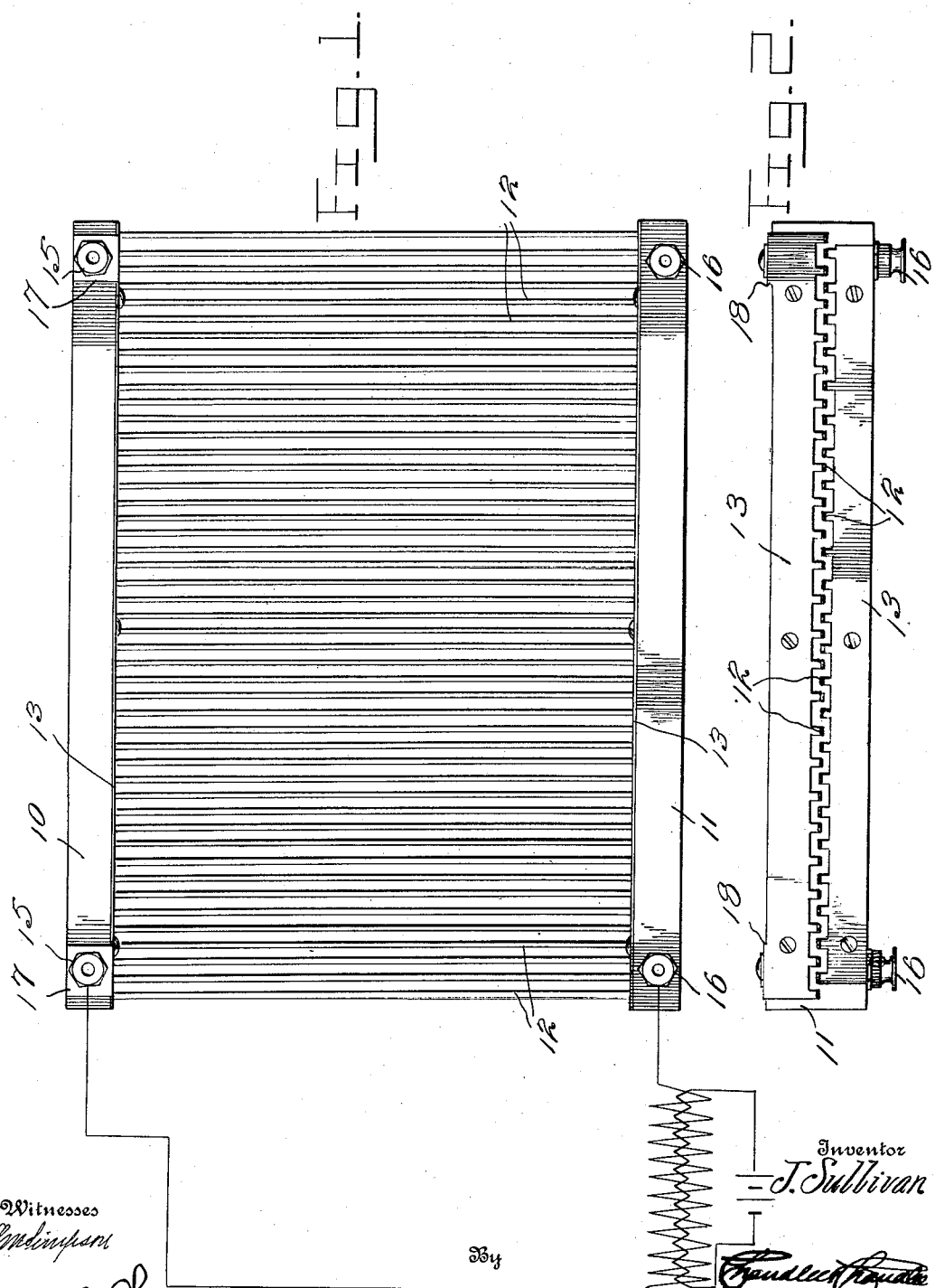

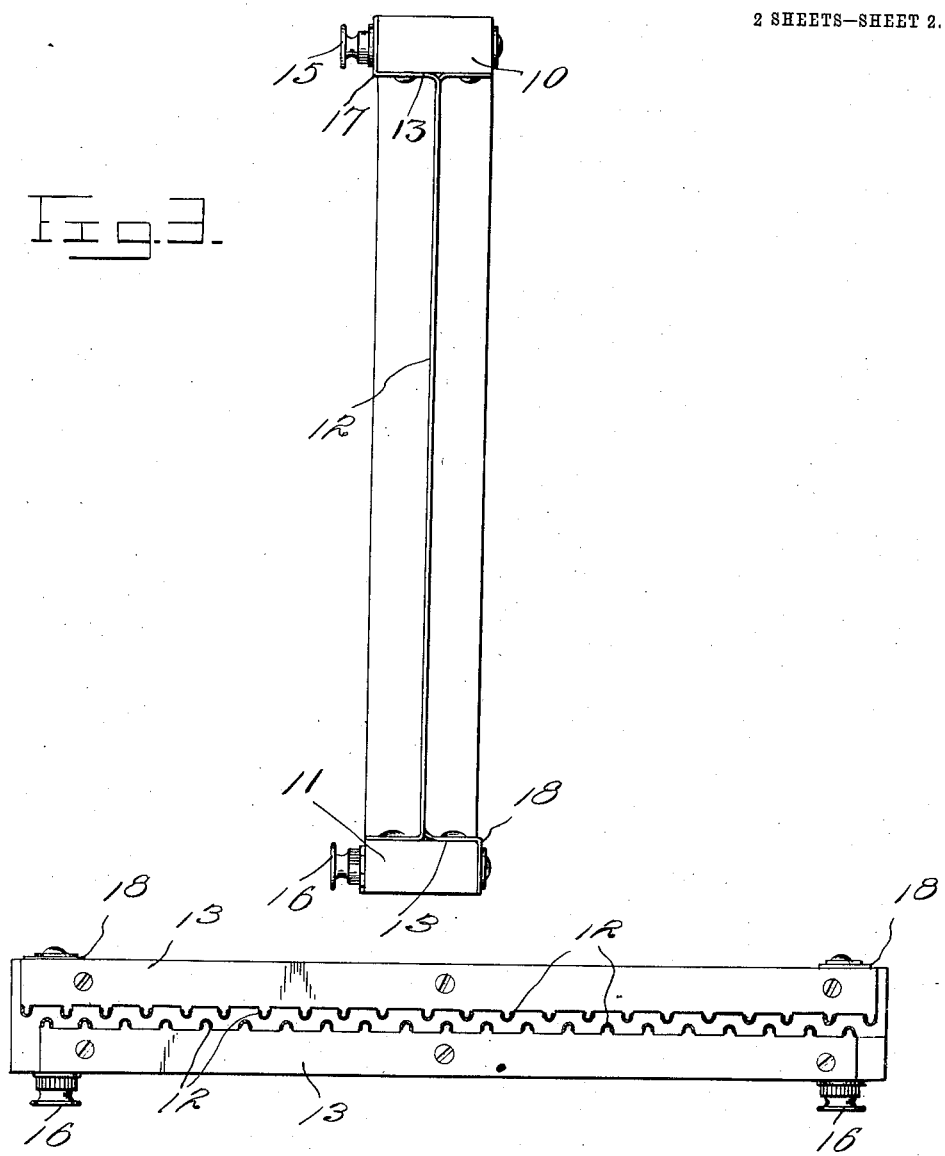

JERRY SULLIVAN, OF BUFFALO, NEW YORK.

INSECT-EXTERMINATOR.

No. 841,905.　　　　　Specification of Letters Patent.　　　　Patented Jan. 22, 1907.

Application filed June 9, 1906. Serial No. 321,038.

*To all whom it may concern:*

Be it known that I, JERRY SULLIVAN, a citizen of the United States, residing at Buffalo, in the county of Erie, State of New York, have invented certain new and useful Improvements in Insect-Exterminators; and I do hereby declare the following to be a full, clear, and exact description of the invention, such as will enable others skilled in the art to which it appertains to make and use the same.

This invention has relation to an electric fly-trap or insect-exterminator; and it is the object of the invention to provide a device having the capabilities indicated that shall be entirely efficient for the purposes for which it is intended and that shall be simple in construction, handy in employment, durable, and not easily gotten out of order.

The invention in its nature embodies a grid or screen of parallel wires alternatively positive and negative, electrically considered, so that a fly alighting on the grid or attempting to walk upon it and touching the adjacent wires will be electrocuted, as it were, and fall dead from the trap.

The trap is of peculiar construction, but at the same time so organized that it may be made by a mechanic of ordinary skill, and though it may not be finely finished it will be as effective in use as though finished to a degree commensurate with a watch of the highest grade.

The invention will first be described in detail in view of the annexed drawings, forming a part of this specification, and then be pointed out with distinctness and particularity in the claims at the conclusion of the disclosure.

Of the said drawings, Figure 1 is a front elevation of the device complete. Fig. 2 is a cross-section of the same, taken centrally through the grid. Fig. 3 is an end view. Fig. 4 is a cross-section of a modified form of metallic strips forming the grid or screen.

The same figures of reference designate the same parts or features, as the case may be, wherever they occur.

The device, as before stated, is very simple in its nature and is composed of two bars 10 and 11, of wood or other non-conducting material, between which extend strips 12, of brass or other suitable material, the said strips being formed by striking them out of a sheet of metal, cutting away a part between them of double their width or more, leaving a broad transverse strip 13 at each end. There are two sets of strips 12 of the kind described, the transverse strips 13 at the ends of one set being bent up at a right angle to the grid-strips and are attached to the inner sides of the bars 10 and 11, and the end strips of the other sheet or set are bent in the opposite direction and are connected with the inner faces of the end bars in such manner as to have the strips interlock, but not touch each other.

There is a binding-post 14 at each end of the frame, but two being necessary for the operation of each machine, the other two being provided for connecting wires therewith and leading them to another trap should that be desired.

The positive and negative wires are connected by binding-posts 15 and 16, the former being seated upon an angular piece 17, extended from one transverse strip 13, and the latter have their posts extended through their bar, which posts are bound on like angular extensions 18 from the other strip 13, and line-wires connect with a source of electric energy of sufficient power to effect the electrocution of insects that may attempt to cross the grid and make electrical connection between two of the wires or strips by touching them.

I have shown and thus far described the strips 12 as though they were flat, but where they are made of very light and thin metal they may be curved so as to make them substantially half-round in cross-section, as shown in Fig. 4.

The common house-fly is readily attracted to anything bright or shiny, avoiding dark and dull objects. Hence it may be found best to place the traps near a window where there is light to attract the flies and destroy them quickly.

What is claimed as the invention is—

1. An electric fly-trap consisting of parallel bars, a lure-grid composed of parallel strips of bright metal formed by removing portions of metal between them and leaving broad transverse strips at their ends, the said transverse strips being turned up at a right angle to the grid-strips and secured to the inner faces of the bars, the grid-strips alternating but not touching, binding-posts and their wires, and angular extensions from the transverse strips bent over on the outer faces of the bars with which extensions the binding-posts are electrically connected.

2. An electric fly-trap consisting of parallel bars, a lure-grid composed of parallel strips of bright metal formed by removing portions of metal between them and leaving broad transverse strips at their ends, the said transverse strips being turned up at a right angle to the grid-strips and secured to the inner faces of the bars, the grid-strips interlocking but not touching and throughout their lengths bent into substantially half-round form in cross-section, the binding-posts and their wires, and angular extensions from the transverse strips bent over on the outer faces of the bars, with which extensions the binding-posts are electrically connected.

3. An electric fly-trap comprising parallel non-conducting bars, a lure-grid disposed between the bars and consisting of parallel strips of bright metal formed in two sets from separate plates, the strips of the two sets being disposed in alternate spaced relation and having connecting portions at their ends, said connecting portions being bent to lie against the inner faces of the bars and secured thereto, and binding-posts carried by the bars and electrically connected one with each set of strips.

4. An electric fly-trap consisting of parallel bars, a lure-grid composed of parallel strips of bright metal formed by removing portions of metal between them and leaving broad transverse strips at their ends, the said transverse strips being turned up at a right angle to the grid-strips and secured to the inner faces of the bars, the grid-strips alternating but not touching, and binding-posts electrically connected with the strips.

In testimony whereof I affix my signature in presence of two witnessses.

JERRY SULLIVAN.

Witnesses:
LAYTON H. VOGEL,
THOMAS H. NOO⋯